United States Patent [19]

Takasugi et al.

[11] Patent Number: 4,680,498
[45] Date of Patent: Jul. 14, 1987

[54] INPUT CIRCUIT IN ULTRASONIC APPARATUS

[75] Inventors: Wasao Takasugi, Higashiyamato; Ryuichi Shinomura, Hachioji; Norio Yokozawa, Fuchu, all of Japan

[73] Assignees: Hitachi, Ltd.; Hitachi Medical Corporation, both of Tokyo, Japan

[21] Appl. No.: 827,602

[22] Filed: Feb. 10, 1986

[30] Foreign Application Priority Data

Feb. 8, 1985 [JP]   Japan .................................. 60-21763

[51] Int. Cl.$^4$ ............................................ H01L 41/08
[52] U.S. Cl. ................................................... 310/319
[58] Field of Search ............................ 310/316–319; 73/596, 620, 627, 629; 128/660

[56]            References Cited
           U.S. PATENT DOCUMENTS

| | | | |
|---|---|---|---|
| Re. 28,596 | 10/1975 | Siegel | 310/319 |
| 3,389,276 | 6/1968 | Gradin et al. | 310/319 |
| 3,390,286 | 6/1968 | Gradin et al. | 310/319 X |
| 3,400,284 | 9/1968 | Elazar | 310/319 |
| 3,903,733 | 9/1975 | Murayama et al. | 310/319 X |
| 3,980,905 | 9/1976 | Miller | 310/319 |
| 3,984,704 | 10/1976 | Lakestani | 310/319 |
| 4,156,157 | 5/1979 | Mabille | 310/316 |
| 4,156,823 | 5/1979 | Suzuki | 310/319 X |

Primary Examiner—Mark O. Budd
Attorney, Agent, or Firm—Antonelli, Terry & Wands

[57]                ABSTRACT

An input circuit in which an input impedance of a reception amplifier connected to a piezoelectric transducer is selected to be lower than an impedance composed of an inter-electrode capacitance of the piezoelectric transducer, an equivalent capacitance of a cable used to connect the piezoelectric transducer to the reception amplifier, etc., that is, the parallel impedance of those elements connected in parallel to the reception amplifier so that the reception amplifier is used as an amplifier of the current detection type.

6 Claims, 8 Drawing Figures

INPUT CIRCUIT IN ULTRASONIC APPARATUS

BACKGROUND OF THE INVENTION

1. Field of the Invention

The present invention generally relates to a diagnostic or an inspection apparatus utilizing an ultrasonic echo signal, and particularly relates to an input circuit system for receiving a signal from a piezoelectric transducer.

2. Description of the Prior Art

In such a diagnostic or an inspection apparatus utilizing an ultrasonic echo signal as typically represented by an ultrasonic diagnostic apparatus, it is required to provide various technical contrivances in a circuit for receiving a reception signal from a piezoelectric transducer. That is, for example, a parallel resonance circuit is arranged by connecting an inductor in parallel to a piezoelectric transducer in order to compensate the reduction in reception voltage at an input terminal of a reception amplifier due to bypassing of the reception signal through an inter-electrode capacity of the piezoelectric transducer and an equivalent capacity of a cable existing in parallel to the inter-electrode capacity. Such compensation or a matching circuit therefor, and an effect thereof are described, for example, in an article by R. N. Thruston; "Effect of Electrical and Mechanical Terminating Resistances on Loss and Bandwidth According to the Conventional Equivalent Circuit of a Piezoelectric Transducer" in IRE Transactions on Ultrasonics Engineering (1960): an article by J. W. Hunt et al.; "Ultrasound Transducers for Pulse - Echo Medical Imaging" in IEEE Transactions on Medical Engineering BME 30, No. 8 (1983), etc.

These conventional input circuits employ such a voltage detection system in which a load resistor is connected to an input terminal of a reception amplifier so that a voltage appearing across the load resistor is amplified by the reception amplifier. Therefore, in view of sensitivity of detection, it is desirable that the load resistance as well as the impedance provided in parallel to the former are made sufficiently high. However, if the Q of the resonance circuit is made larger than the mechanical Q of the piezoelectric transducer, the duration of pulses becomes long while the amplitude thereof is increased at the terminal of the load resistor, so that the resolution is deteriorated. Accordingly, the Q of the resonance circuit is limited within a predetermined range and therefore the load resistance can not be made sufficiently high. Consequently, the effect of the compensation circuit is limited correspondingly.

Further, in such a conventional input circuit of the voltage detection system, it is necessary to provide an inductor and therefore the conventional input circuit is not suitable to be formed into an integrated circuit.

SUMMARY OF THE INVENTION

An object of the present invention is therefore to provide an input circuit in an ultrasonic apparatus, which is suitable to be formed into an integrated circuit.

Another object of the present invention is to provide an input circuit in which the influence due to an inter-electrode capacitance of a piezoelectric transducer, an electrostatic capacitance of a cable, etc., can be compensated by an arrangement with parts the smallest in number.

The present invention is featured in that without using any load of high impedance at an input terminal of a reception amplifier connected to a piezoelectric transducer, input impedance of the reception amplifier is made lower than parallel impedance which is composed of, for example, an inter-electrode capacitance of the piezoelectric transducer connected in parallel to the input impedance and an equivalent capacity of a cable through which the piezoelectric transducer and the reception amplifier are connected to each other. That is, the input circuit according to the present invention is of a so-called current detection system, while the conventional input circuit is of the voltage detection system.

The present invention will be apparent from the following detailed description taken in conjunction with the accompanying drawings.

DESCRIPTION OF THE PREFERRED EMBODIMENTS

For the better understanding of the present invention, an example of the conventional input circuit of the voltage detection system will be first described with reference to FIG. 1 prior to the detailed description of preferred embodiments according to the present invention.

Figure 1:
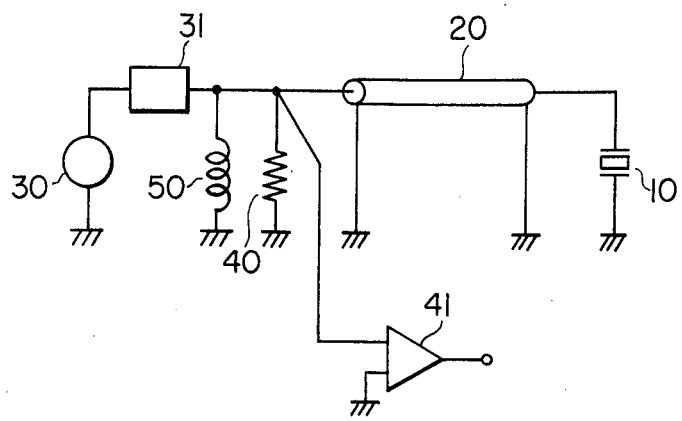
FIG. 1 is a circuit diagram showing the conventional input circuit.

In FIG. 1, a piezoelectric transducer 10 is connected to a driving power source 30 through a cable 20. The piezoelectric transducer 10 receives a high voltage pulse and produces an ultrasonic pulse signal. An ultrasonic echo signal which is the ultrasonic pulse signal reflected by an object is received again by the piezoelectric transducer 10 and converted into an electric signal again and the electric signal is applied to a load resistor 40 through the cable 20 to produce a reception voltage. The reception voltage is amplified by an amplifier 41 and an output of the amplifier 41 is applied to a signal processing circuit (not shown in FIG. 1) for performing picturization or the like. In FIG. 1, an inductance 50 is connected in parallel to the piezoelectric transducer 10 to constitute a parallel resonance circuit together with an inter-electrode capacitance of the piezoelectric transducer 10 and an equivalent capacitance of the cable 20, so as to compensate the reduction in reception output voltage of the load resistor 40 due to the bypassing of the reception signal through the both capacitances.

An element 31 is provided for separating the driver 30 from the piezoelectric transducer 10 so as to prevent the driver 39 from acting as a load upon reception. For example, a circuit in which two diodes are antiparallelly connected may be employed as the element 31.

Figure 2:
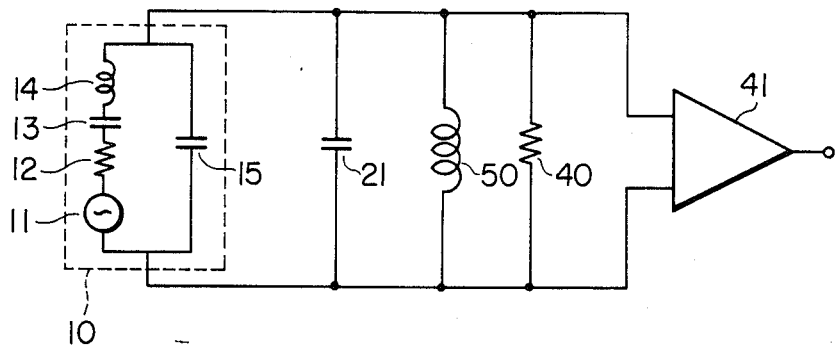
FIG. 2 is an equivalent circuit diagram corresponding to the circuit of FIG. 1.

FIG. 2 is a simplified equivalent circuit diagram corresponding to the conventional input circuit of the voltage detection system. In FIG. 2, the piezoelectric transducer 10 is shown by an equivalent circuit constituted by a signal source 11 in which a received ultrasonic signal is converted into an electric signal, an equivalent resistance 12, series resonance elements 13 and 14, and an inter-electrode electrostatic capacitor 15. Further, the cable 20 is shown by an equivalent electrostatic capacitor 21 as a lumped constant.

Figure 3:
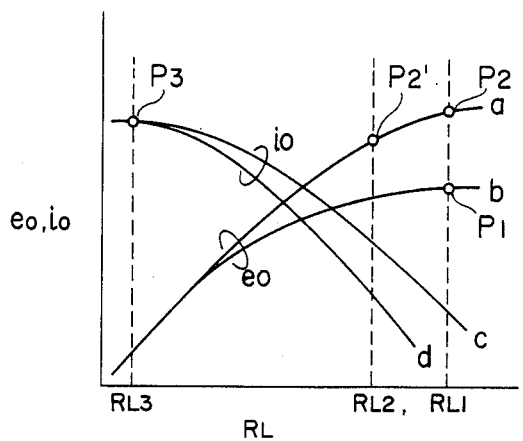
FIG. 3 is a characteristic diagram for explaining a principle of the input circuit according to the present invention in comparison with the conventional one.

FIG. 3 shows various characteristics of the circuit of FIG. 2, with the abscissa representing the resistance value $R_L$ of the load resistor 40 and the ordinate representing a terminal voltage $e_o$ across the load resistance $R_L$ and a current $i_o$ flowing through the load resistance $R_L$. Particularly, a curve b shows the relationship between $R_L$ and $e_o$ under the assumption that the parallel inductor 50 is omitted while a curve a shows the same relationship between $R_L$ and $e_o$ but under the condition that the parallel inductor 50 is selected to have an inductance value which provides parallel resonance together with the capacities 15 and 21 at the signal frequency is inserted. That is, the terminal voltage $e_o$ is changed from a point $P_1$ to a point $P_2$ with respect to a certain load resistance value $R_{L1}$ by the insertion of the inductor 50. Therefore, the difference in terminal voltage between the points $P_1$ and $P_2$ represents an effect due to the compensation by the inductor 50. However, when the parallel inductor 50 is inserted, the Q value of the input circuit becomes high to lengthen the duration of the reception signal, so that the resolution of the ultrasonic apparatus in the direction of depth is deteriorated. For this, it is necessary to use a so-called Q damping method in the case where the inductor 50 is connected to the piezoelectric transducer 10. That is, the Q of the input circuit is made low by using a resistance value $R_{L2}$ lower than the resistance value $R_{L1}$ to thereby prevent deterioration from occurring in the waveform. Therefore, actually, the difference in terminal voltage between the points $P_1$ and $P_2'$, represents the effect due to the compensation. As seen from FIG. 3, in the voltage detection system in which the voltage produced across the resistance $R_L$ is detected, it is necessary to make the input impedance of the amplifier 41 sufficiently higher relative to the resistance value $R_L$.

Further, FIG. 3 shows the characteristic of the current $i_o$ flowing in the resistance $R_L$. Respective curves c and d show the current characteristics respectively corresponding to the curves a and b. A voltage generated in the signal source 11 is substantially independent of the load resistor so that the current $i_o$ becomes larger as the resistance value $R_L$ becomes smaller. Accordingly, the current $i_o$ is substantially constant independently of the resistance value $R_L$ in the region where the resistance value $R_L$ is low relative to the impedance (the value of the equivalent resistor 12 etc.) of the elements existing parallelly with the resistance value $R_L$, for example, the inter-electrode capacity of the piezoelectric transducer, the equivalent capacity of the cable 20, etc. In FIG. 3, a point $P_3$ where the resistance $R_L$ assumes a value $R_{L3}$ represents such a case as described above. It is important that at the point $P_3$ the curves c and d lie substantially one on the other. That is, in this region, the current is less influenced by the parallel elements because the resistance value $R_L$ is smaller than the parallel impedance composed of the capacities 15 and 21. Accordingly, it is not necessary to provide the parallel inductor 50 for the compensation.

According to the present invention, therefore, a reception amplifier is made to operate at the point $P_3$ of FIG. 3. That is, the impedance of a load element (the load resistor 40 in FIG. 2) connected to an input terminal of the reception amplifier, and the input impedance of the reception amplifier, is made lower than the impedance of elements connected in parallel to the load element, that is, the impedance composed of an inter-electrode capacity of a piezoelectric transducer, an equivalent capacity of a cable, and the like, and a current flowing in the load element is detected.

Figure 4:
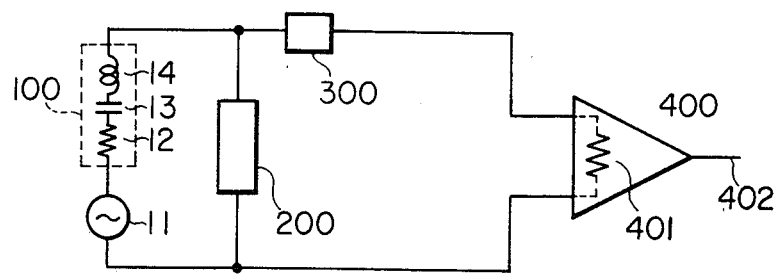
FIG. 4 is an equivalent circuit diagram corresponding to the input circuit according to the present invention.

FIG. 4 is a circuit daigram showing the principle of a first embodiment according to the present invention. Similarly to FIG. 2, a piezoelectric transducer is shown by a simplified equivalent circuit, and the reference numeral 11 designates an equivalent signal source owing to an echo signal. Also, the reference numeral 12 to 14 designate parts corresponding to those of FIG. 2, however, these series elements 12 to 14 are shown generally as a signal source impedance 100. Elements corresponding to the inter-electrode capacity 15 of the piezoelectric transducer, the equivalent capacity 21 of the cable used to connect the piezoelectric transducer and the amplifier to each other, and the like in FIG. 2, that is, the elements connected in parallel to a load element 401 of a reception amplifier are shown as a parallel impedance 200. Further, elements serially, connected between the piezo-electric transducer and a reception amplifier, that is, a series impedance components such as a series resistor of the cable, and the like, are shown as a series impedance 300. The reference numerals 400 and 401 designate the reception amplifier and the input impedance thereof respectively. The reception amplifier 400 is arranged such that an output corresponding to a value of current flowing in the input impedance 401 appears at an output terminal 402 of the amplifier 400. Further, in the case where the piezo-electric transducer is used both for the signal transmission and reception, the respective impedances of the separation element 31 and the driver 30 upon reception as shown in FIG. 1 are also contained in the parallel impedance 200. Moreover, in the case where the input circuit includes a switch or an over-input protective circuit for inserting the separation element 31 between the piezoelectric transducer and the reception amplifier, a turn-on resistor for the switch or the protective circuit is contained in the series impedance 300.

In FIG. 4, the condition required for causing a signal current from the echo signal source 11 to efficiently flow in the load element 401 is such that the total impedance of the input impedance 401 and the series impedance 300 is sufficiently smaller than the value of the parallel impedance 200. The value of the series impedance 300 is very small, and therefore the condition for efficiently performing the current detection is such that the input impedance 401 of the reception amplifier 400 is made sufficiently smaller than the parallel impedance 200 composed of the inter-electrode capacity of the piezoelectric transducer and the equivalent capacity of the cable, and further the parallel impedance of the driver, the separation element, etc.

Figure 5:
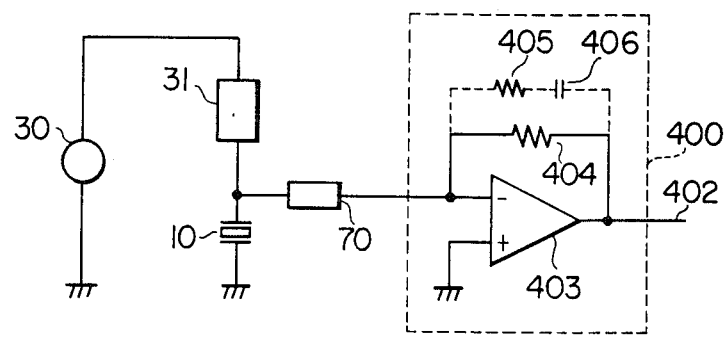
FIGS. 5, 6, and 7 are circuit diagrams showing embodiments according to the present invention respectively.

FIG. 5 shows an embodiment of the input circuit for realizing the equivalent circuit of FIG. 4. The reception amplifier 400 is constituted by an inverted-input type amplifier 403 and a feedback resistor 404 used to connect an output terminal and an inverted-input terminal of the inverted-input type amplifier 403 to each other. The inverted-input terminal and a piezoelectric transducer 10 are connected to each other through a cable or through a selecting switch or an over-input protective circuit designated by the reference numeral 70. The reference numerals 30 and 31 designate a transmission driver and a separation element respectively, similarly to the case of FIG. 1.

The thus arranged reception amplifier 400 is called a trans-impedance type amplifier or current transfer type amplifier. The input impedance of the amplifier 400 has a value obtained by dividing the resistance value of the feedback resistor 404 by a loop gain and the value of the input impedance becomes sufficiently smaller than the parallel impedance composed of the distributed capacity of the cable, the inter-electrode capacity of the piezoelectric transducer 10, the impedances by the transmission driver 30 and the separation element 31, etc., that is, the parallel impedance shown generally by the reference numeral 200 in FIG. 4. Therefore, the circuit of FIG. 5 becomes a high-sensitive input circuit of the current detention type.

Further, in such a trans-impedance type amplifier as described above, there are some cases where the output thereof is influenced by the impedance value and the frequency characteristic of the signal source, that is, the piezoelectric transducer 10. In this case, as shown by a broken line in FIG. 5, it will do to connect a frequency compensation circuit constituted by, for example, a resistor 405, and a capacitor 406 to the feedback circuit.

Figure 6:
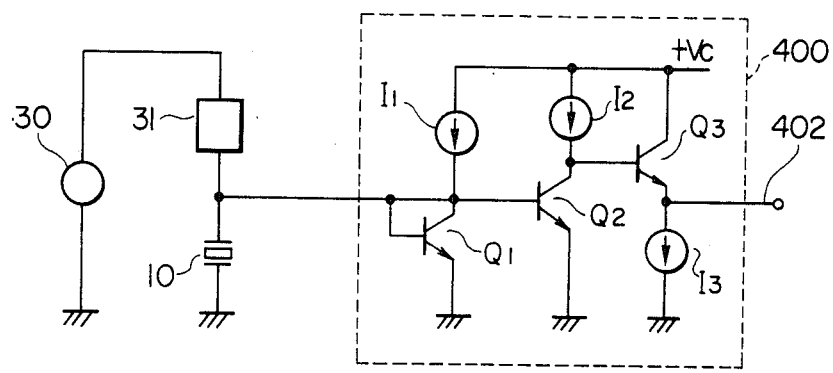

FIG. 6 shows another embodiment of the input circuit for realizing the equivalent circuit of FIG. 4. In FIG. 6, the reception amplifier 400 is constituted by three directly connected NPN transistors $Q_1$, $Q_2$, and $Q_3$, the collector and base of the transistor $Q_1$ being directly connected to form a diode connection. The anode of the thus formed diode is connected to a current source $I_1$, and the cathode of the same is grounded. Further, the anode of the diode is connected also to a piezoelectric transducer 10 as well as the base of the transistor $Q_2$. The collector of the transistor $Q_2$ is connected to a current source $I_2$ and the emitter thereof of the same is grounded. Further, the collector of the transistor $Q_2$ is connected also to the base of the transistor $Q_3$, and the emitter of the transistor $Q_3$ is grounded through a current source $I_3$. The symbol $+V_c$ represents a positive power source. In the most simplified case, each of the current source $I_1$, $I_2$, and $I_3$ may be constituted by a resistor.

The transistor $Q_1$ and $Q_2$ constitute a current mirror circuit. That is, an output signal current from the piezoelectric transducer 10 is superimposed onto the diode biased by the current source $I_1$ so that an output corresponding to the signal current is obtained at the collector of the transistor $Q_2$. The transistor $Q_3$ constitutes an emitter follower circuit, so that an output signal is obtained at an output terminal 402 of the reception amplifier 400 by using the low impedance. The input impedance of the reception amplifier 400 is determined in accordance with the operating current (the value of the current source $I_1$) of the diode (the transistor $Q_1$), and takes a value substantially equal to $V_T/I_1$ where $V_T$ represents a thermal voltage of the transistor $Q_1$. The thermal voltage $V_T$ takes a value of about 26 mV at room temperature. Accordingly, assuming that $I_1=2$ mA, the input impedance of the reception amplifier 400 is about 13 ohms. That is, the input impedance of the reception amplifier 400, shown by the reference numeral 401 in FIG. 4, is made sufficiently smaller than the parallel impedance 200.

Also in the circuit of FIG. 6, a switch, an over-input protective circuit, or the like may be inserted between the reception amplifier 400 and the piezoelectric transducer 10 in the same manner as in the circuit of FIG. 5.

Figure 7:
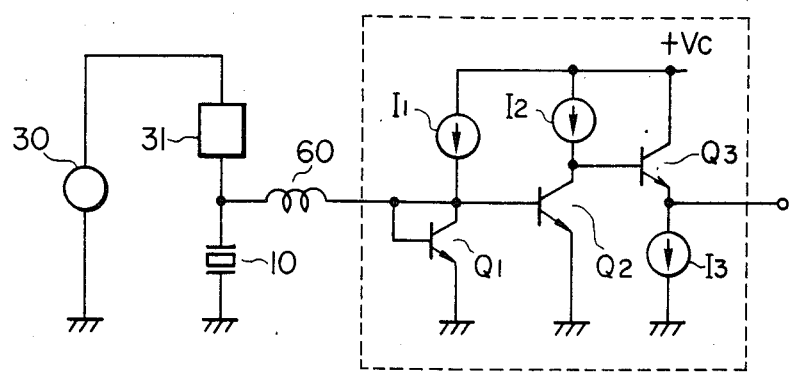
Figure 8:
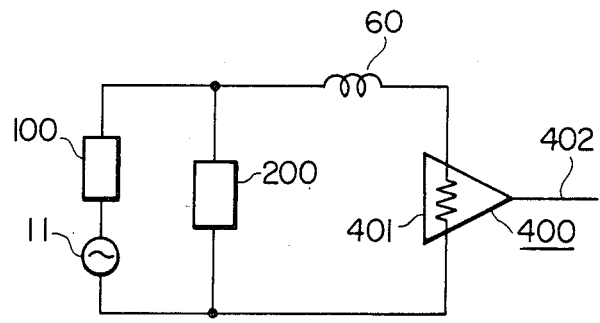
FIG. 8 is an equivalent circuit diagram corrsponding to the circuit of FIG. 7.

FIG. 7 shows still another embodiment according to the present invention. The embodiment of FIG. 7 is different from that of FIG. 6 in that an inductor 60 is inserted between a piezoelectric transducer 10 and a reception amplifier 400. FIG. 8 shows an equivalent circuit for the circuit of FIG. 7. In this embodiment, the inductor 60 is selected to have an inductance value which resonates with a capacitive component of a parallel impedance 200 at the signal frequency. As the result, a resonance current flows in a detection resistor 401, so that deterioration in signal caused by the parallel impedance is compensated. Although the deterioration in signal due to the parallel impedance can be suppressed by the arrangement in the embodiment of FIG. 7, it becomes unnecessary to provide such an inductor 60 as used in Fig. 7 arrangement in many cases in the arrangement of FIG. 5 or FIG. 6 because the input impedance 401 of the reception amplifier 400 can be made sufficiently small.

As described above, according to the present invention, it is possible to obtain such an extremely meritorious effect in practical use that the deterioration in echo signal caused by the parallel impedance composed of the parallel capacity inherently provided in the piezoelectric transducer, the capacity of the cable, and the like can be prevented without utilizing any particular element, and rather, it is possible to make unnecessary the inductor used for the compensation. This effect becomes more effective as the piezoelectric transducer is more miniaturized and the frequency is more increased, and therefore the present invention has such an excellent feature that it is possible to realize an apparatus having a high performance in spite of its simple arrangement.

We claim:

1. An input circuit in an ultrasonic apparatus comprising:
    a piezoelectric transducer having a predetemined inter-electrode capacitance;
    a reception amplifier for amplifying an output electric signal from said piezoelectric transducer;
    means electrically connecting said piezoelectric transducer to said reception amplifier and having a predetermined equivalent capacitance; and
    said reception amplifier having an input impedance which is lower than a parallel impedance composed of said inter-electrode capacitance and said equivalent capacitance at a frequency of said output electric signal, said reception amplifier including a current mirror type amplifier electrically connected to said piezoelectric transducer and an output amplifier for amplifying an output of said current mirror type amplifier.

2. An input circuit in an ultrasonic apparatus according to claim 1, in which said current mirror type amplifier includes a diode arranged at its input, and a current source for biasing said diode.

3. An input circuit in an ultrasonic apparatus, comprising:
    a piezoelectric transducer having a predetermined inter-electrode capacitance;
    a driver connected to said piezoelectric transducer through a separation circuit;
    a reception amplifier for amplifying an output electric signal from said piezoelectric transducer;

means electrically connecting said piezoelectric transducer to said reception amplifier and having a predetermined equivalent capacitance; and said reception amplifier having an input impedance which is lower than a parallel impedance composed of the series circuit of said driver and said separation circuit, said inter-electrode capacitance, and said equivalent capacitance, at a frequency of said output electric signal.

4. An input circuit in an ultrasonic apparatus, comprising:

a piezoelectric transducer having a predetermined inter-electrode capacitance;

a reception amplifier for amplifying an output electric signal from said piezoelectric transducer;

cable means for connecting said piezoelectric transducer and said reception amplifier, said cable means having a predetermined equivalent capacitance at a value which, when compared with a value said inter-electrode capacitance, is required to be considered for proper operation of said input circuit; and said reception amplifier having an input impedance which is lower than a parallel impedance composed of said inter-electrode capacitance and said equivalent capacitance at a frequency of said output electric signal.

5. An input circuit in an ultrasonic apparatus according to claim 4, in which said cable means includes a switch for selecting said piezoelectric transducer.

6. An input circuit in an ultrasonic apparatus according to claim 4, in which said cable means includes an over-input protective means.

* * * * *